United States Patent
Pi et al.

(10) Patent No.: US 7,087,887 B1
(45) Date of Patent: Aug. 8, 2006

(54) OPTICAL MULTIPHASE FLOW SENSOR

(75) Inventors: Bo Pi, Carlsbad, CA (US); Shulai Zhao, Encinitas, CA (US); Zhihao Chen, Carlsbad, CA (US)

(73) Assignee: IFOS, Inc., Santa Clara, CA (US)

( * ) Notice: Subject to any disclaimer, the term of this patent is extended or adjusted under 35 U.S.C. 154(b) by 148 days.

(21) Appl. No.: 10/697,673

(22) Filed: Oct. 29, 2003

Related U.S. Application Data

(60) Provisional application No. 60/422,755, filed on Oct. 31, 2002.

(51) Int. Cl.
*G02B 6/26* (2006.01)

(52) U.S. Cl. .......................... 250/227.14; 250/227.24; 385/12

(58) Field of Classification Search ........... 250/227.14, 250/227.25; 385/12
See application file for complete search history.

(56) References Cited

U.S. PATENT DOCUMENTS

| | | | | |
|---|---|---|---|---|
| 4,386,269 A * | 5/1983 | Murphy | ................. | 250/227.25 |
| 4,637,729 A * | 1/1987 | Schoch | ................. | 356/410 |
| 5,164,608 A * | 11/1992 | Vali et al. | ................. | 250/577 |
| 5,168,156 A * | 12/1992 | Fischer et al. | ......... | 250/227.21 |
| 5,324,933 A * | 6/1994 | Berkcan | ................. | 250/227.23 |
| 5,903,685 A * | 5/1999 | Jones et al. | ................. | 385/12 |
| 6,490,391 B1 | 12/2002 | Zhao et al. | ................. | 385/30 |
| 6,501,875 B1 | 12/2002 | Zhao et al. | ................. | 385/30 |
| 6,516,114 B1 | 2/2003 | Zhao et al. | ................. | 385/30 |
| 6,542,663 B1 | 4/2003 | Zhao et al. | ................. | 385/30 |
| 6,549,713 B1 | 4/2003 | Pi et al. | ................. | 385/137 |
| 6,556,746 B1 | 4/2003 | Zhao et al. | ................. | 385/30 |
| 6,571,035 B1 | 5/2003 | Pi et al. | ................. | 385/30 |
| 6,597,833 B1 | 7/2003 | Pi et al. | ................. | 385/30 |
| 6,621,951 B1 | 9/2003 | Zhao et al. | ................. | 385/30 |
| 6,621,952 B1 | 9/2003 | Pi et al. | ................. | 385/30 |
| 6,625,349 B1 | 9/2003 | Zhao et al. | ................. | 385/30 |
| 6,650,799 B1 * | 11/2003 | Lyons | ................. | 385/12 |

OTHER PUBLICATIONS

Ramos, et al.; Oblique-Tip Fiber-Optic Sensors for Multiphase Fluid Discrimination; Journal of Lightwave Technology, vol. 17, No. 8, Aug. 1999.

* cited by examiner

*Primary Examiner*—Thanh X. Luu
*Assistant Examiner*—Stephen Yam
(74) *Attorney, Agent, or Firm*—Jay A. Chesavage

(57) ABSTRACT

Waveguide sensors having a side-polished coupling port at the waveguide cladding to sense a material based on material-specific optical attenuation by evanescent coupling at the coupling port.

20 Claims, 8 Drawing Sheets

OPTICAL MULTIPHASE FLOW SENSOR

This application claims the benefit of U.S. Provisional Application No. 60/422,755 entitled "OPTICAL SENSING OF MULTIPHASE FLOW BASED ON EVANESCENT OPTICAL COUPLING" and filed Oct. 31, 2002, the entirety of the disclosure of which is incorporated herein by reference as part of this application.

This application relates to optical sensing devices based on evanescent optical coupling through a side-polished surface in an optical waveguide such as fibers and other waveguides.

Optical waveguides may be made of a waveguide core and a waveguide cladding outside the waveguide core. The refractive index of the core is greater than that of the cladding so that one or more optical modes may be spatially confined within the core. The core may be partially or completely clad by the cladding. Planar waveguides, ridge waveguides, and embedded waveguides and fibers are some examples of optical waveguides.

As an example of a more general optical waveguide, a typical fiber may be simplified as a fiber core and a cladding layer surrounding the fiber core. Light rays that are coupled into the fiber core within a maximum angle with respect to the axis of the fiber core are totally reflected at the interface of the fiber core and the cladding. This total internal reflection provides a mechanism to spatially confine the optical energy of the light rays in one or more fiber modes to guide the optical energy along the fiber core. Optical fibers essentially operate as "light pipes" to confine light within the fiber boundary and transfer light from one point to another.

The guided optical energy in the fiber or waveguide, however, is not completely confined within the core of the fiber or other optical waveguides. In a fiber, for example, a portion of the optical energy can "leak" through the interface between the fiber core and the cladding via an evanescent field that essentially decays exponentially with the distance from the core-cladding interface. This evanescent leakage may be used to couple optical energy into or out of the fiber core, or alternatively, to perturb the guided optical energy in the fiber core.

SUMMARY

This application describes examples of optical sensing devices and techniques by using the evanescent leakage through a side-polished surface of an optical waveguide. In some implementations, the optical waveguide may be implemented with optical fiber. According to one implementation, a sensing device may include a fiber having a side surface on fiber cladding within an evanescent field of guided light in the fiber, a metal layer formed on the side surface and having a thickness to transmit the evanescent field, an optical detector to receive guided light in the fiber passing through the side surface and to produce a detector output, and a processing circuit to measure an optical loss of the guided light at the side surface from the detector output and operable to extract a property of the medium above the metal layer from the measured optical loss. Because the energy of the evanescent field transmitting through the metal layer varies with a refractive index of a medium present above the metal layer, the measured optical loss may be used to determine presence or absence of one or more materials in the medium above the metal layer.

In application, this sensing device may be used to measure material components in a material mixture by contacting the device with the material mixture under measurement so that the material mixture is present above the metal layer. In this regard, a probing light beam at a probing wavelength may be directed into the fiber where a fraction of the probing light beam is coupled out of the side surface through the metal layer. An optical loss of the probing light beam output from the fiber is then measured. The measured optical loss is then used to determine at least whether a selected material component is present in the material mixture. In making this determination, the measured optical loss may be compared to a calibrated optical loss measurement for the selected material obtained at the same probing wavelength. In addition, the measured optical loss may be compared to a calibrated optical loss measurement for a second selected material obtained at the same probing wavelength to determine whether the second selected material is present in the material mixture. Furthermore, a duration of the measured optical loss for the selected material may be measured to determine a percentage of the selected material present in the material mixture. The selected material may be a gas or a liquid (e.g., water and an oil).

These and other implementations are described in greater detail in the drawings, the detailed description, and the claims.

DETAILED DESCRIPTION

Figure 1:
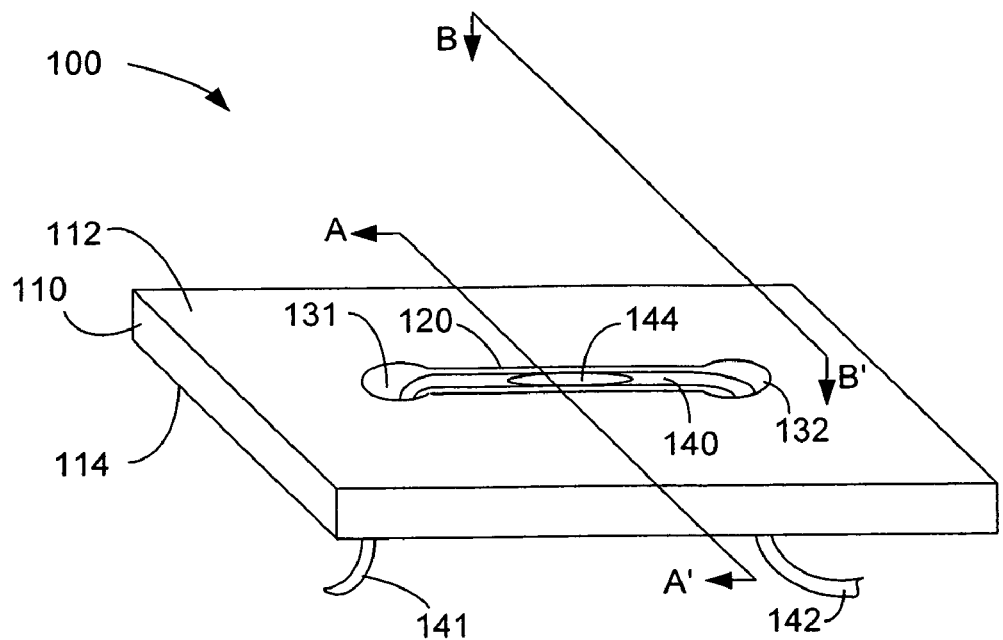
FIG. 1 shows one embodiment of a fiber device that integrates or engages a fiber to a substrate with a groove for positioning the fiber and openings for holding the fiber.

The optical sensing devices described in this application operate based on the dependence of the evanescent coupling at a side-polished surface of an optical waveguide on the refractive index of a material present at the external side of the side surface. This is because the evanescent coupling is sensitive to the boundary conditions at or near the side-polished surface. In general, if the environment around the side-polished surface changes, the evanescent coupling can change accordingly. This change can be reflected in the remaining guided light. Hence, a measurement of this change in the remaining guided light in the fiber or waveguide may be calibrated and used to measure the change in the environment. For a given structure at the side surface, materials with different refractive indices at the external side surfaces cause different evanescent coupling strengths for a given probing light wavelength. This relationship hence can be calibrated to determine the presence of the material by measuring the optical loss at the side surface.

In one implementation, such an optical sensing device, may include an optical waveguide having a side surface on the waveguide cladding within an evanescent field of guided light in the waveguide, and a metal layer formed on the side surface and having a thickness to transmit the evanescent field. An optical detector may be used to receive guided light in the waveguide passing through the side surface and to produce a detector output. A processing circuit may be provided to measure an optical loss of the guided light at the side surface from the detector output. The processing circuit is operable to extract a property of the medium above the metal layer from the measured optical loss. The waveguide may be implemented as planar waveguides, ridge waveguides, and embedded waveguides, and optical fiber. The implementations described here will use optical fiber as an example.

Use of optical fibers for implementing the sensing devices allows for convenience and flexibility in deployment of a sensor. In addition, fiber is commercially available at a much cheaper price than other waveguides. The fiber in the sensing devices of this application may be integrated on a substrate. One or more fibers may be integrated on or engaged to the substrate fabricated with one or more grooves. One portion of the cladding of each fiber is removed and polished to form a fiber coupling port as the sensing area. In general, the polished surface on the fiber cladding is sufficiently close to the fiber core so that optical energy can be coupled via evanescent fields out of the fiber core for optical monitoring. Two or more such fiber coupling ports may be formed at different positions in each fiber when needed. The following sections first describe the basic structures for integrating fibers onto substrates for forming side-polished fiber coupling ports based on evanescent coupling. Implementations of fiber sensing devices based on such structures are then described in detail.

Figure 2A:
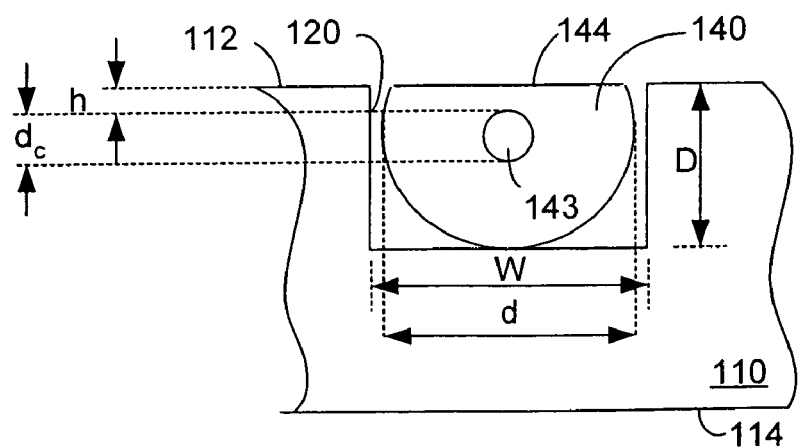
FIGS. 2A and 2B show a cross sectional view of the device in FIG. 1 along the direction AA' and a side view of the device in FIG. 1 along the direction BB', respectively.
Figure 2B:
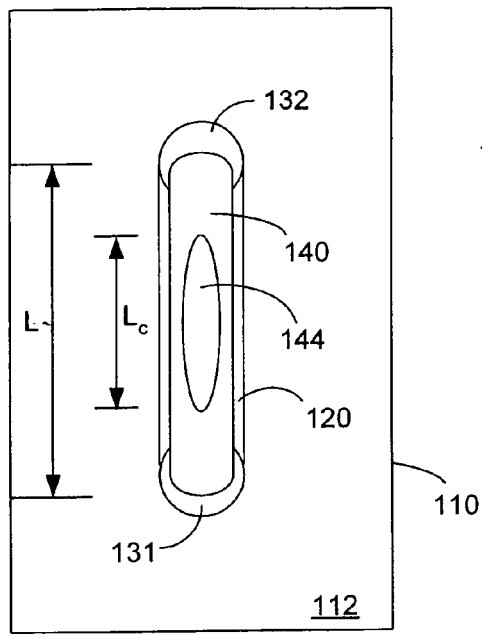

FIG. 1 shows one embodiment of a fiber device 100 where a fiber 140 is integrated or engaged to a substrate 110. The fiber device 100 may be used as a building block to construct a variety of fiber devices, including but not limited to, fiber optical monitors, fiber couplers, fiber attenuators, fiber modulators, fiber beam splitters, optical fiber switches, and fiber frequency-division multiplexers. FIGS. 2A and 2B show additional details of the fiber device 100.

The substrate 110 may be formed of various materials, such as semiconductors, insulators including dielectric materials (e.g., a glass, a quartz, a crystal, etc), metallic materials, or any other solid-state materials that can be processed to form the device features such as grooves and through holes disclosed herein. Two parallel and opposing substrate surfaces, 112 and 114, are generally flat and may be polished. An elongated groove 120 is formed in the substrate 110 on the surface 112 and is essentially a recess from the surface 112. The groove 120 may be fabricated by removing a portion of the material from the substrate 110 through etching or other processes.

Figure 2C:
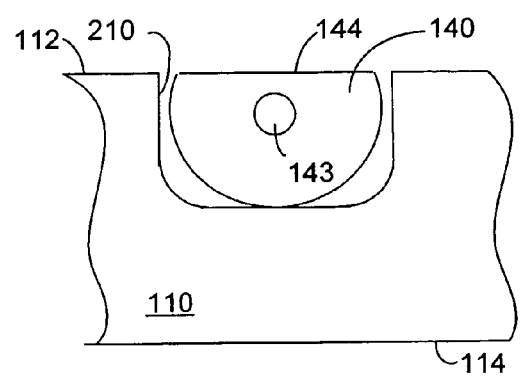
FIGS. 2C and 2D show examples of two different cross sections for grooves shown in FIG. 1.
Figure 2D:
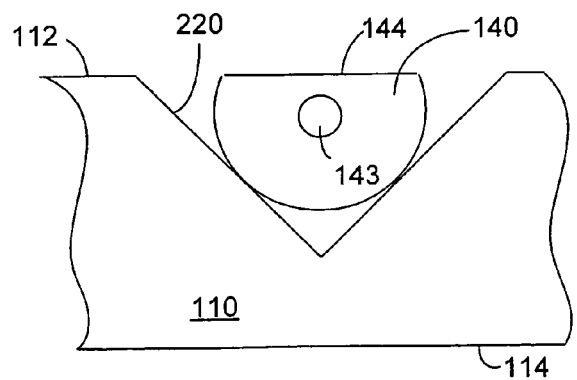

The geometry of the groove 120 is generally elongated along a straight line as illustrated or along a curved line. Unless otherwise indicated, the following description will use straight-line grooves as examples. Some embodiments are described with specific reference to groove with V-shaped cross sections as shown by the groove 220 in FIG. 2D. The cross sections are generally not so limited and may also be other shapes as well, including rectangular as shown in FIG. 2A, U-shaped as shown by the groove 210 in FIG. 2C, a circularly shape or other suitable shapes. Unless specifically indicated otherwise, the techniques, structures, and applications disclosed in this application are generally applicable to grooves of different shapes.

Figure 2E:
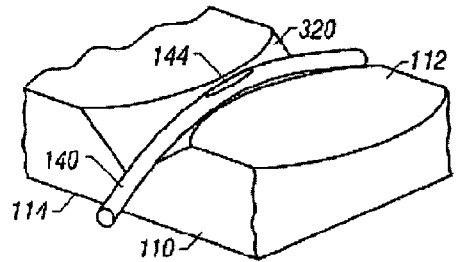
FIG. 2E shows one example of a V groove with varying depth and width.

The width, W, of the groove 120 is generally greater than the diameter, d, of the fiber 140 and may either remain a constant or vary spatially along the groove 120, e.g., increasing from the center towards the two ends as illustrated in the V groove 220 in FIG. 2E. The length, L, of the groove 120 may vary from one grove to another and can be determined based on specific requirements of applications. The depth D of the groove 120 may be a constant or may vary along the groove 120, e.g., increasing from the center towards the two ends as shown in FIG. 2E. In general, at least a portion of the groove 120 has a depth D to expose a portion of the fiber cladding of the fiber 140 above the surface 112 while still keeping the fiber core below the surface 112. Sometimes, the depth D of the groove 120 may also be selected to expose the fiber core. Other portions of the groove 120 may have a different depth so that the fiber can be placed within the groove 120 under the substrate surface 112. Depending on the geometry of the groove 120 (e.g., the apex angle of a V-shaped groove), the depth D of the entire groove 120 may be greater than fiber diameter d. For a groove with a rectangular cross section as shown in FIG. 2A, at least a portion of the groove 120 has a depth D less than the fiber diameter d but greater than the sum of the fiber radius $r=d/2$ and radius of the fiber core $r_c=d_c/2$. This portion of the groove 120 exposes partial fiber cladding of the fiber 140 above the surface 112 while still keeping the fiber core below the surface 112. Other portions of the groove 120 may have a depth that is at least the fiber diameter d so that the fiber can be essentially placed in the groove 120 below the surface 112. However, in certain applications, the depth D of the entire groove 120 may be greater than fiber diameter d to avoid evanescent coupling of a guided mode. Unless otherwise indicated, the following description will assume that at least a portion of a groove 120 to expose a portion of the fiber cladding above the surface 112 and adjacent portions sufficiently deep to keep the fiber below the surface 112. In case of the rectangular groove 120, the central portion of the groove 120 may have a depth D less than d but greater than $(d+dc)/2$ while the portions on either sides of the central portion may have a depth equal to or greater than the fiber diameter d.

The fiber device 100 may include two openings 131 and 132 that are respectively formed at the two ends of the groove 120 and penetrate through the substrate 110. Hence, the openings 131 and 132 are through holes extending between the two surfaces 112 and provide access from one surface (112 or 114) to another. The spacing between the openings 131 and 132 essentially determines the length L of the groove 120. The aperture of the openings 131 and 132 should be sufficiently large to receive the fiber 140, e.g., with a diameter greater than the diameter of the fiber 140. The shape of the holes 131 and 132 may generally be in any suitable geometry.

A portion of the fiber 140 is placed in the groove 120 near the surface 112. The remaining portions 141, 142 of the fiber 140 on both sides of the portion in the groove 120 are respectively fed through the first and second openings 131, 132 to the other side 114 of the substrate 110. After being placed in the substrate 110 as shown in FIG. 1, the fiber 140 may be slightly pulled by moving the fiber portions 141 and 142 in opposite directions so that the portion of the fiber 140 in the groove 120 is in substantially full contact with the groove 120.

Since a portion of the groove 120 has a depth D less than the fiber diameter d, the cladding of the fiber 140 in this portion protrudes out of the surface 112. The fiber core in this portion of the fiber is generally kept under the surface 112. For example, the cladding of a central portion of the fiber 140 between the holes 131 and 132 may be exposed. This protruded or exposed cladding is then removed or polished to form a flat surface 144 of a length $L_c$ that is above the fiber core 143 and is substantially coplanar with the surface 112 of the substrate 110 as illustrated in FIG. 2B. When the spacing, h, between the flat surface 144 and the fiber core 143 is sufficiently small (e.g., on the order of or less than one wavelength of optical energy), the flat surface 144 can be used to couple optical energy into or out of the fiber core 144 through the evanescent fields outside the fiber core. Hence, the length, $L_c$, of the flat surface 144 approximately represents the optical coupling length for the fiber device 100. This coupling surface 144 may also be non-flat, e.g., curved to a certain extent, as long as it can transmit evanescent signals.

Alternatively, only one through hole 132 in the substrate 110 may be needed to engage the fiber 140 to form the fiber module for coupling with a waveguide module. As shown in the design 301 in FIG. 3A, the groove 120 may extend to one end side 310 of the substrate 110 so that one end 141 of the fiber 140 leaves the groove 120 without going through a through hole. In addition, FIG. 3B shows a conventional design 302 in which the groove 120 may extend to two opposing end sides 310 and 330 of the substrate 110 so that the fiber 140 is engaged to the groove 120 without relying on any through holes.

Figure 3A:
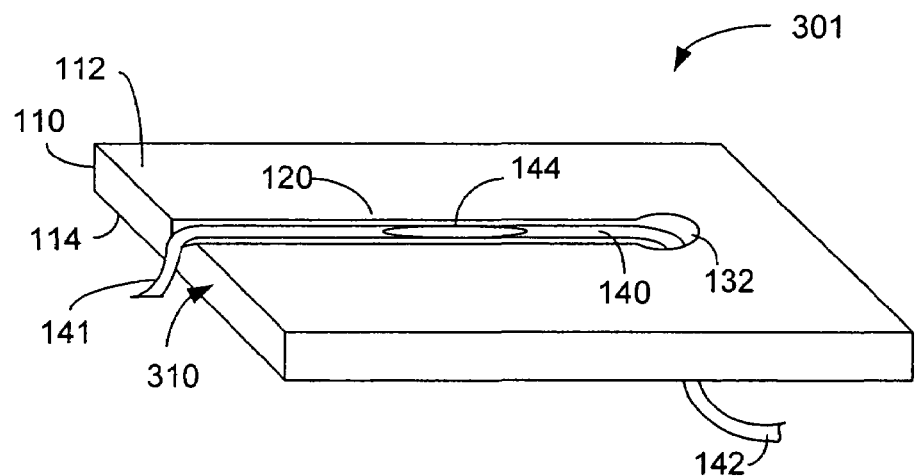
FIG. 3A shows a design to engage a fiber on to a substrate by using an elongated groove with a single through hole, where a portion of the fiber cladding is removed and polished to form a side-polished evanescent coupling port.
Figure 3B:
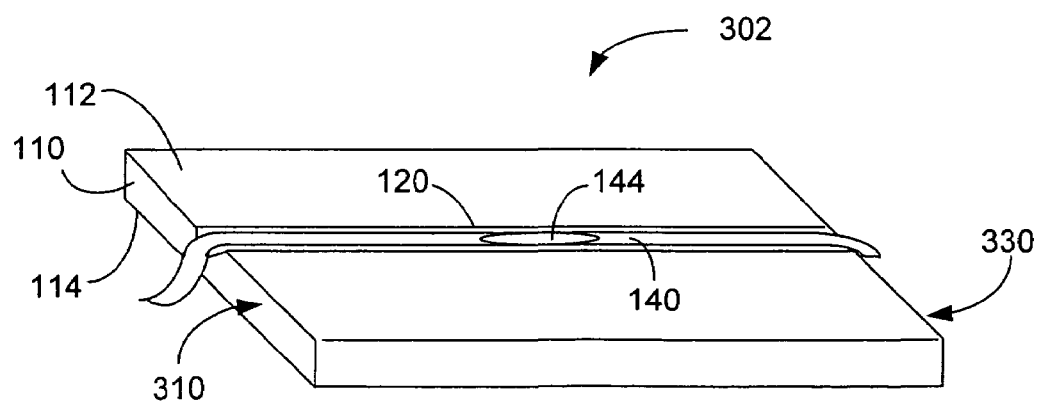
FIG. 3B shows another way of engaging a fiber onto a substrate without using through holes shown in FIG. 1, where a portion of the fiber cladding is removed and polished to form a side-polished evanescent coupling port.

The through holes in the substrate 110 shown in FIGS. 1 and 3A, may be used to engage a single fiber on both sides of a substrate to form two or more side-polished coupling ports for evanescent coupling. For example, two grooves may be formed on opposite sides of the substrate 110 to share a common through hole at ends. A fiber may be threaded through the substrate 110 to have one fiber portion in the groove on one side and another fiber portion in the groove on the opposite side of the substrate 110. Hence, fiber coupling ports may be formed in the same fiber on both sides of the substrate 110. This structure may be use to construct a variety of fiber devices, including stacking two substrates to provide optical coupling from a fiber in one substrate to another fiber in another substrate. The fabrication of this double-sided fiber structure may be implemented by polishing the substrate and the fiber on both sides as described The following sections describe examples of fiber sensing devices based on the above fiber devices with one or more side-polished fibers.

Figure 4:
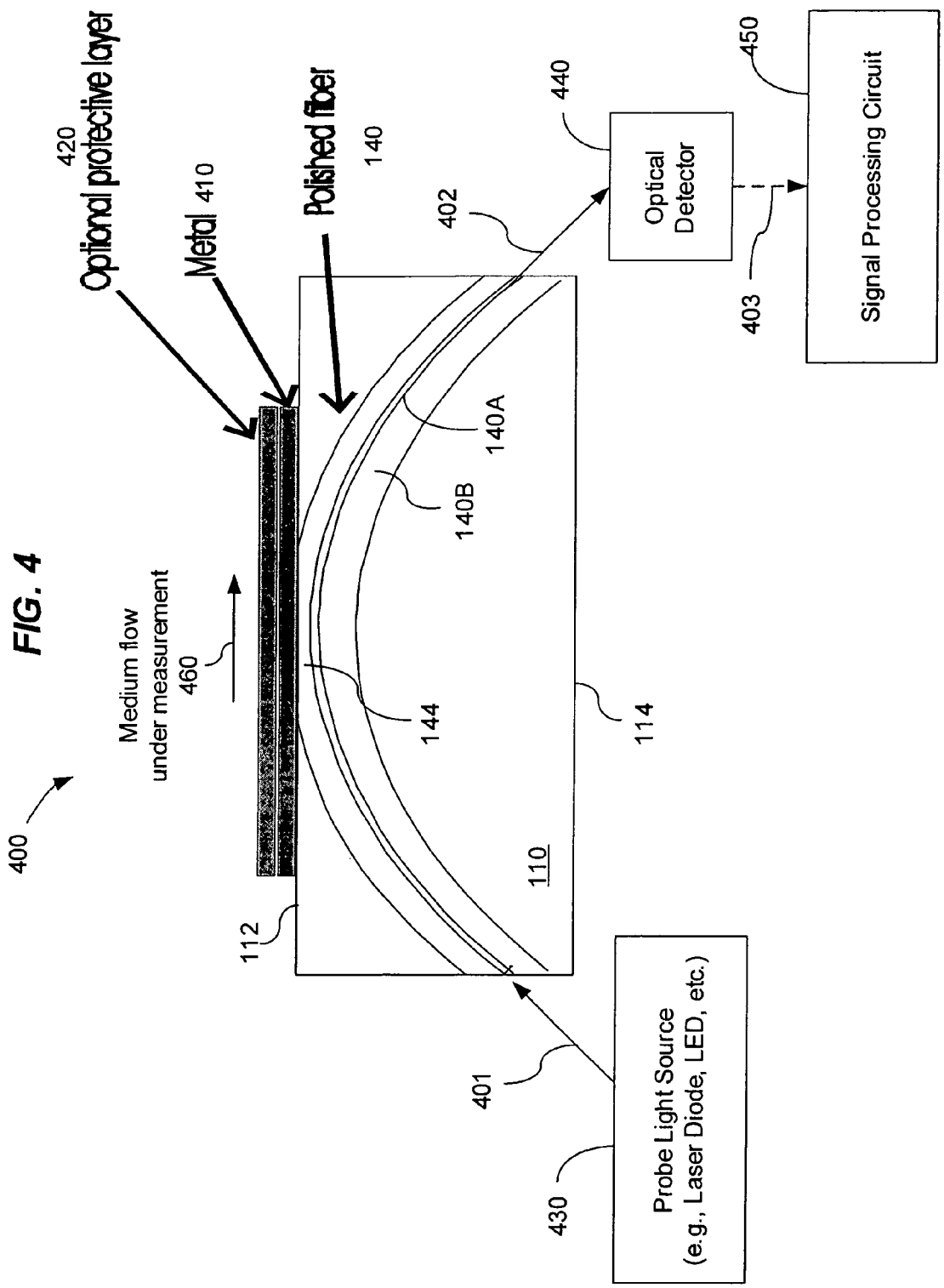
FIG. 4 shows one exemplary fiber sensing device formed over a side-polished fiber.

FIG. 4 shows a fiber sensing device 400 for measuring material 460 present at its sensing area. The material 460 may be a flow of a mixture of different materials such as gases and liquids (e.g., water and oil). A fiber 140 with a core 140A and a cladding 140B has one portion whose cladding is partially removed to form a surface 144. The surface 144 is within the extent of the evanescent field of the guided light in the fiber core 140A. The surface 144 is polished to operate as the fiber coupling port. The amount of evanescent light at the surface 144 may be set at a desired percentage of the total guide ling in the fiber 140 by controlling the distance between the fiber core 140A and the surface 144 during the fabrication phase. The evanescent light decays in magnitude exponentially with the distance. Hence, the closer the surface 144 to the fiber core 144A, the higher the percentage of the evanescent light being coupled out of the fiber.

In the device 400, the substrate 110 is shown to operate as a fiber support that holds the fiber 140. The substrate 110 has two opposing surfaces 112 and 114. A depth-varying groove 120 may be formed on the surface 112 of the substrate 110. When the fiber 140 is placed in the groove 120, the cladding of the fiber portion where the surface 144 is formed protrudes above the surface 112. The protruded cladding is then removed to form the surface 144 which is approximately coplanar with the surface 112. Other portions of the fiber 140 in the groove 120 stay under the surface 112. As described above, different ways may be used to engage the fiber 140 to the substrate 110 to form the fiber coupling port 144 for evanescent coupling. The fiber 140 generally may be any fiber, including single-mode fibers, multi-mode fibers, and birefringent fibers. In particular, the fiber 140 may be a polarization maintaining (PM) fiber to preserve the polarization state of light to be transmitted.

Notably, a metal layer 410 is formed over the surface 144. Metals such as chromium (Cr), nickel (Ni), sliver (Ag) and others may be used. The metal layer 410 is designed to be sufficiently thin so that light in the evanescent field can transmit through the metal layer 410 to reach the material present above the metal layer 410. In general, the thickness of the metal layer 410 may be about or less than the depth of the electric field associated with the evanescent field in the metal layer 140. For example, the thickness of the metal layer 410 may be a few tens of nanometers. If the metal layer 410 is made of chromium, the thickness may be about tens of nanometers for a probe wavelength around 1550 nm. Hence, the evanescent field of the guided light is exposed to the external material 460 through the metal layer 410. The external surface of the metal layer 410 is therefore the sensing area for the sensing device 400. The metal layer 410 provides an interface to allow the device 400 to detect a material whose index varies from 1 to 1.6 or greater. To a certain extent, the evanescent field at the metal layer 410 excites plasma oscillations on the metal layer 410 and the energy in plasma oscillations is lost from the evanescent field.

An optional protective layer 420 may be formed over the metal layer 410 to protect the metal layer 410 from being eroded or otherwise damaged by the material 460. Different materials may be used for the protective layer 420 depending on the materials to be measured with the device 400. Certain carbon-based coatings may be used as the protective layer 420, such as diamond-like carbon films.

The fiber sensing device 400 further includes a probe light source 430 to produce a probe light beam 401 at a selected probe wavelength. The source 430 may include, for example, a laser diode, a light-emitting diode (LED), or an Amplified Spontaneous Emission (ASE) source such as a polarized ASE source. The input probe light beam 401 transmits through the fiber 140 including the sensing area at the side surface 144 as an output probe beam 402. An optical detector 440 is used to receive a portion or the entirety of the transmitted light 402 in the fiber 140. The received transmitted light 402 is converted into a detector signal 403. A signal processing circuit 450 is used to process the detector signal 403 to extract the desired information about the composition of the material mixture 460. The circuit 450 may include calibrated optical losses for various materials that are obtained through a calibration process. The measured optical loss is then compared to the calibrated optical losses to pick out the matching materials in the material mixture 460.

In certain applications, the material mixture 460 may be a liquid flow with different contents, such as a mixture of different liquids and one or more gases. Such a mixture flow is a "multiphase" flow because it includes material compositions of different phases such as gases and liquids. For example, in the oil industry, it is common to have multiphase flow of mixed gas, water and oil from the flows obtained from the oil wells. In various applications, it may be desirable to detect the presence of various constituents of such a mixture flow.

The optical properties of different components in the flow are generally different. For example, various gaseous component of a multiphase flow has an optical index of refraction that is close to 1, the refractive index of water is close to 1.333, and the refractive indices of various oils are generally greater than that of water, e.g., near 1.5. Such differences in optical indices of refraction may be used to measure the concentrations of different components in the flow.

The sensing device 400 in FIG. 4 may be operable to measure the content fraction in a multiphase flow. The sensing area of the device 400 is small and thus may be occupied by one material component in the flow at a time. The guided light can be evanescently coupled out of the fiber 140 through the metal layer 410 and thus the remaining light in the fiber 140 is attenuated. Under this configuration, the evanescent coupling strength through the side-polished surface varies with the effective optical index of refraction above the thin metallic layer 410. Hence, when different components of a multiphase flow pass through above the sensing area, the coupling strength changes. This dependence of the coupling strength may be measured and pre-calibrated for different flow components to measure the different phases in the flow.

In terms of the optical loss for light in the fiber 140, the light loss in the fiber 140 is sensitive to optical index of the material 460 above the metal layer 410. Hence, the light source 430 may be coupled to the input end of the fiber 140 to inject probing light 401 at a selected probe wavelength and the optical detector 440 may be coupled to the output end of the fiber 140 to receive the attenuated output light 402 from the fiber 140. The processing circuit 450 is coupled to receive the detector signal 403 from the optical detector 440 and produces an indication based on the pre calibration data as to whether a particular component is present in the flow under the measurement. In actual operation, the sensor is placed in contact with the flow, e.g., by being located in the flow or on the surface of the flow.

Figure 5:
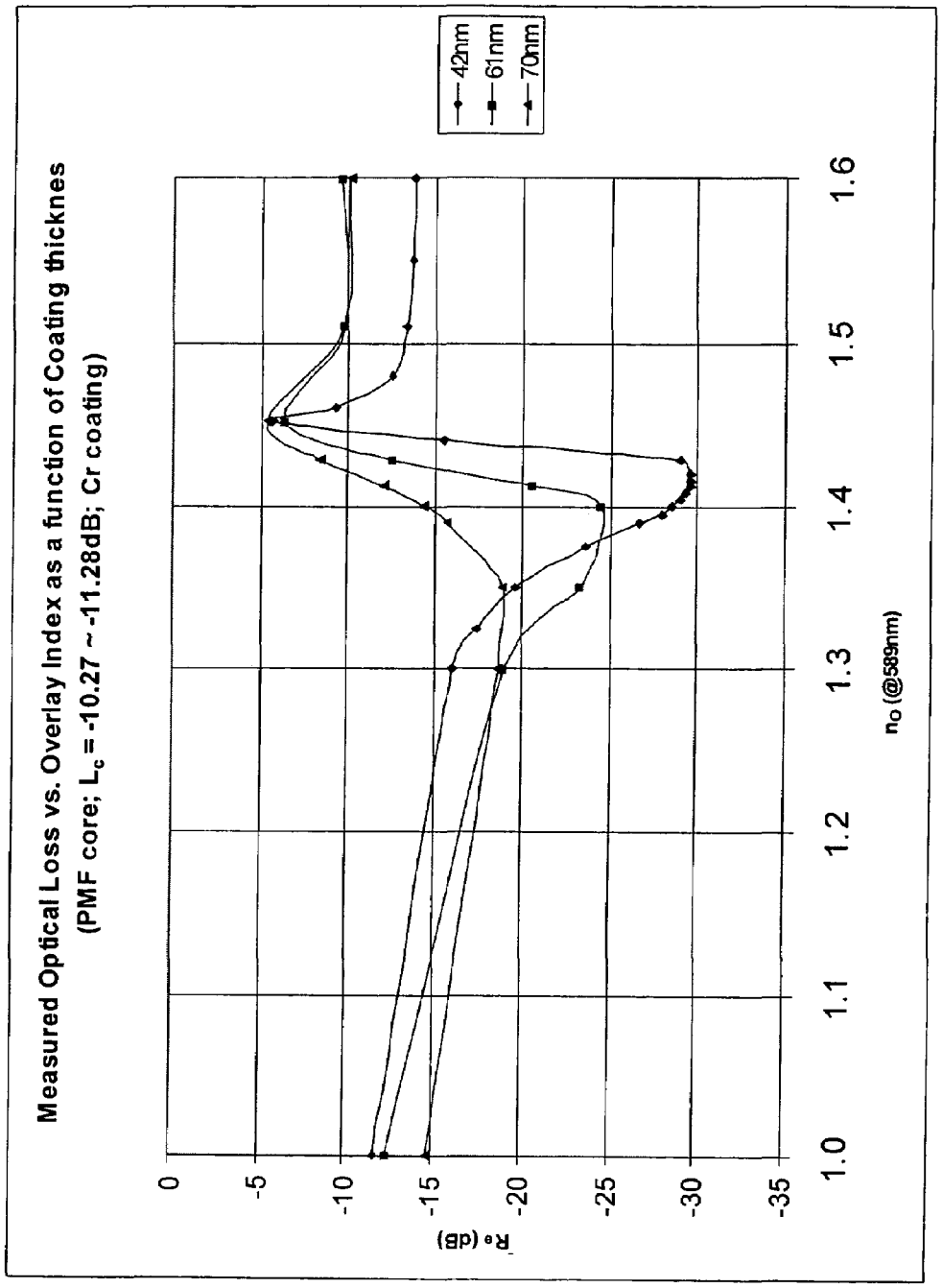
FIG. 5 shows measured optical losses as a function of the refractive index outside the metal layer in the sensor shown in FIG. 4 for different thickness values of the metal layer.

FIG. 5 shows measurements of light loss Re as a function of the index of the material 460 over the metal layer 410 for different thickness values of Cr metal coatings as the metal layer 410 with the probe wavelength at 1550 nm in a fiber sensor based on the design in FIG. 4. The values of the refractive index of the material 460 above the metal layer 410 are values at the wavelength of 589 nm. Measurements in FIG. 5 demonstrate that the light loss can change with the refractive index of the material 460 to create a maximum loss at a particular index for the material above the sensing port for a fixed probe wavelength. Based on this property of the design in FIG. 4, different sensors with different thickness values for the metal layer 410 formed of the same metal may be designed to have different maximum losses for different material components in the multiphase flow. For example, one such a sensor may be designed to exhibit a maximum loss when the water with a refractive index at about 1.333 is present above the sensing port. Another sensor may be designed to exhibit a maximum loss when an oil with a refractive index at about 1.5 is present above the sensing port.

As an alternative implementation, the thin metal layer 410 may be removed for sensing a material with a refractive index greater than the effective index (about 1.45) of the fiber 140. When there is no metallic layer above the side-polished fiber cladding, the guided light in the fiber experiences no or very little loss for a material with an index below 1.45 to be present above the sensing port. Thus, a sensor without the metal layer 410 may be used to detect oil with a refractive index at about 1.5 in the multiphase flow.

Figure 6:
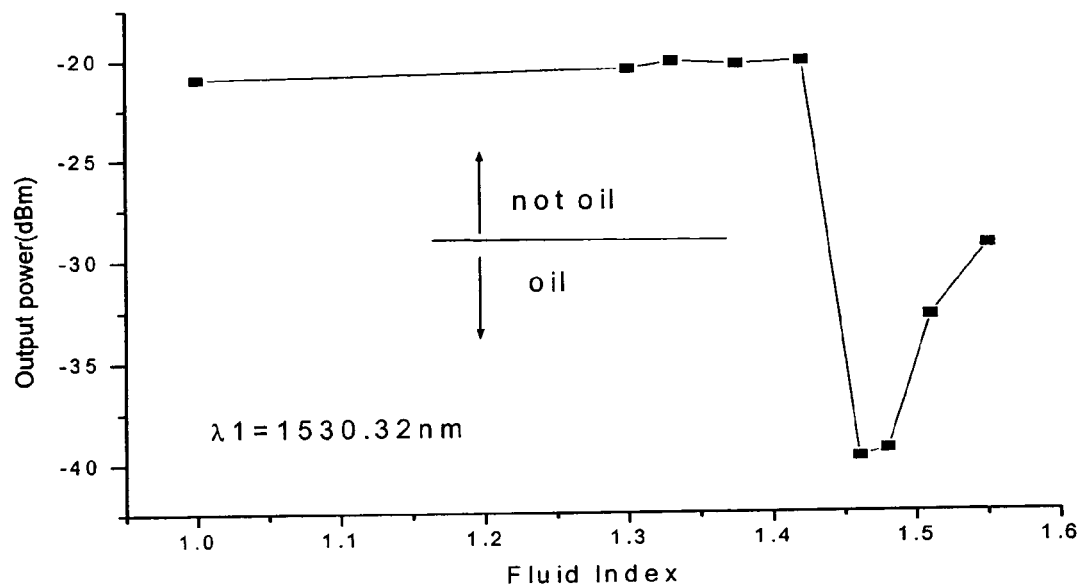
FIG. 6 shows exemplary measurements of optical loss with the sensor in FIG. 4 in measuring a fluid with a probe wavelength at 1530.32 nm.

FIG. 6 shows measured output power of a sensor based on FIG. 4 as a function of the refractive index of a fluid under measurement. The sensor discriminates the phase of a material mixture by classifying the material as "oil" and "not oil." This sensor has a high ratio of signal to noise in detecting the presence of oil. FIG. 6 also shows a large dynamic range of change in the refractive index of oil materials.

The variation of optical power in the output 402 of the sensor 400 in FIG. 4 may be caused by various sources, including a variation in the probe light source 430 and a change in the evanescent coupling at the metal layer 410 caused by the change in the material 460. In order to overcome the power fluctuation of the source 430 and transmission loss occurred in the fiber due to the environmental interference, the measurements of optical power of the output 402 may be carried out simultaneously at two separate wavelengths $\lambda 1$ and $\lambda 2$ within the output 402. The ratio of the measured optical power levels at the two different wavelengths is then used to measure the optical loss caused by the change in the material 460. In implementation, two narrow passband filters at separate wavelengths $\lambda 1$ and $\lambda 2$ to filter and separate signals in the output 402. Two detectors are then used to respectively measure the optical powers of two filtered optical signals at $\lambda 1$ and $\lambda 2$. The light source 410 may have a relatively wide spectral range in its emission to cover two sepparate wavelengths $\lambda 1$ and $\lambda 2$. In one implementation, the light source may be a polarized ASE source. In another implementation, two laser diodes operated at $\lambda 1$ and $\lambda 2$, respectively, may also be used and a modified ratio of light loss at $\lambda 1$ and $\lambda 2$ may be used.

Figure 7:
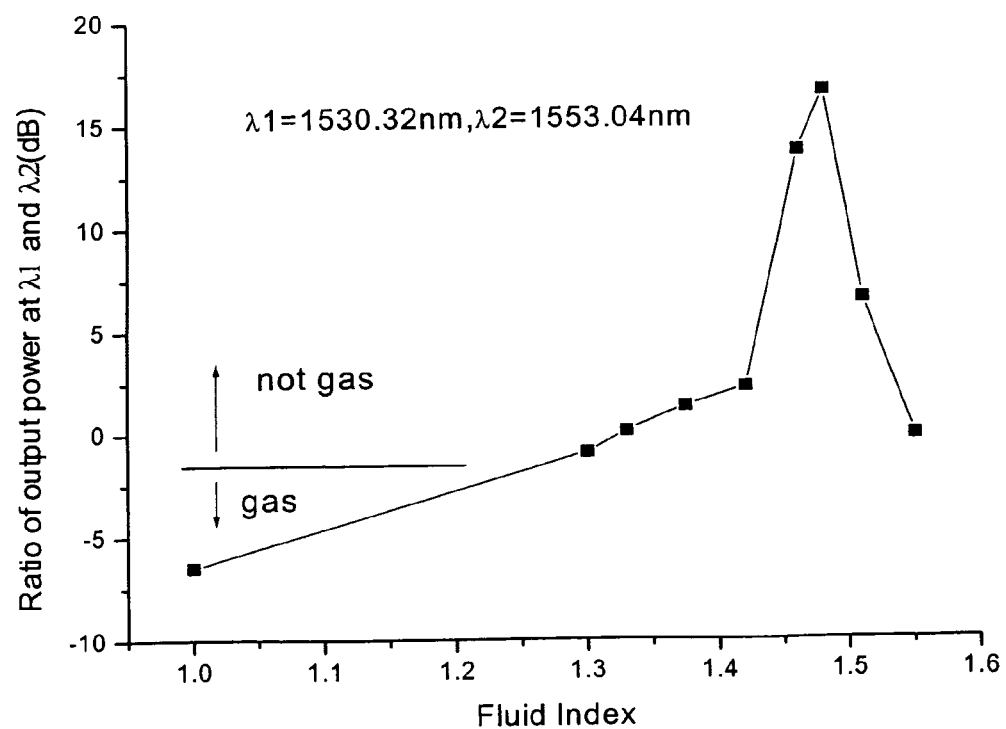
FIG. 7 shows exemplary measurements of the ratio of optical losses with the sensor in FIG. 4 in measuring a mixture flow with different material components with two probe wavelengths at 1530.32 nm and 1553.32 nm, respectively.

FIG. 7 shows the ratio of output power levels of optical signals at wavelengths 1530.32 nm and 1553.04 nm by using a sensor based on the design in FIG. 4. The measured ratio is used to discriminate between the phase of gas and the non-gas phase with a ratio of signal to noise larger than 4 dB. The detector system uses two filters to select wavelengths of 1530.04 nm and 1553.04 nm, respectively.

Figure 8:
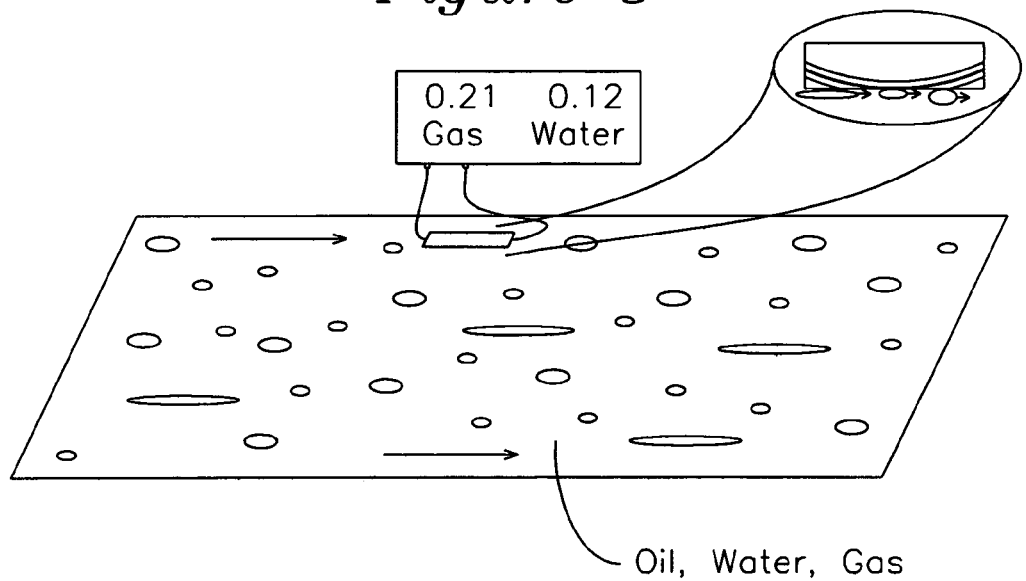
FIG. 8 shows a fiber sensing device that has two fiber sensors for respectively measuring presence of water and oil.

FIG. 8 shows an exemplary multiphase sensing device with two or more fiber sensors in a sensor package 810 in contact with a multiphase flow 800. Each of the sensors is designed to measure one designated component of the multiphase flow 800 so that the sensors can simultaneously measure different components. Different optical detectors are coupled to different fibers to measure optical losses caused by presence of different flow components. A processing circuit 820 processes the detector signals from the different sensors to generate indicator signals which are displayed on a display unit of the processing circuit 820. As illustrated, the display shows the gas and the water in a mixed oil flow.

In addition to detection of presence of certain materials, the percentage of each material in the mixture may also be determined by measuring the durations of the optical losses associated with different materials. This measurement is based on the assumption that the duration in which a particular material is present is proportional to the amount of that material in the mixture.

Figure 9:
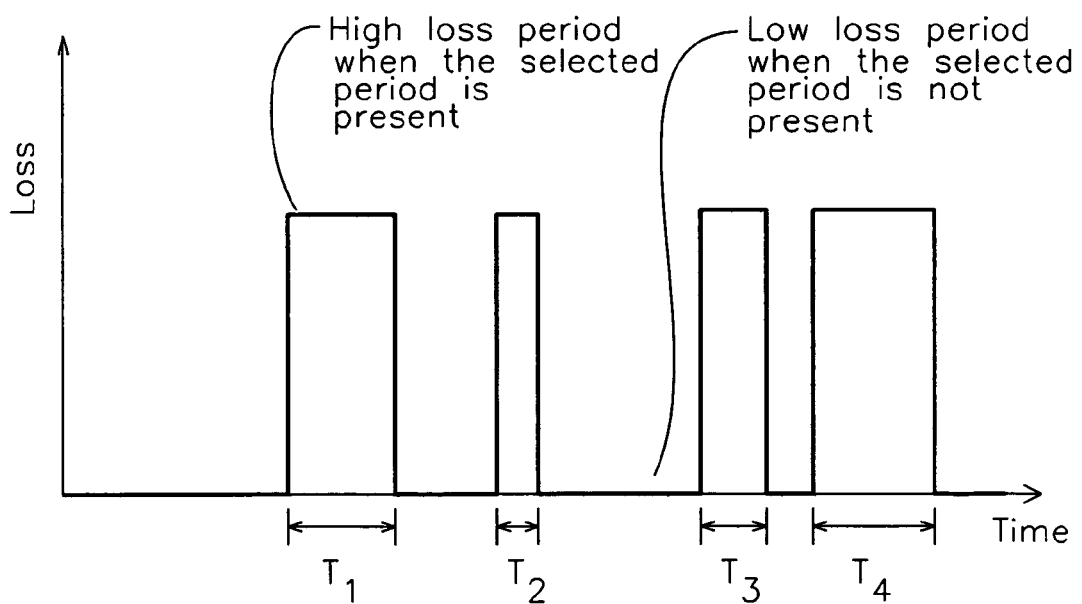
FIG. 9 illustrates an example of the measured optical loss as a function of time by a sensor designed to have a high optical loss for a particular material when measuring a mixture flow with different material components.

FIG. 9 shows an exemplary signal out of a fiber sensor in the instrument in FIG. 8. The measured optical loss in the output of the fiber sensor has separate periods of a high loss. When one sensor detects a high loss to the guided light, this indicates that the current portion of the flow on the surface of the sensor is the component it is designed to measure. Separate periods of the high loss represent the material which the sensor is specifically designed to measure is present at the sensor at different times. A period of a low loss in the signal indicates one or more other materials are present in the mixture flow that the present fiber sensor is not designed to have a high optical loss. In addition, the percentage of time during which such a high loss is measured has a direct correlation with the fraction of the component in the mixed multiphase flow. Hence, this measured percentage of time may be used to measure the content fraction of the particular component in the mixed flow.

Figure 10:
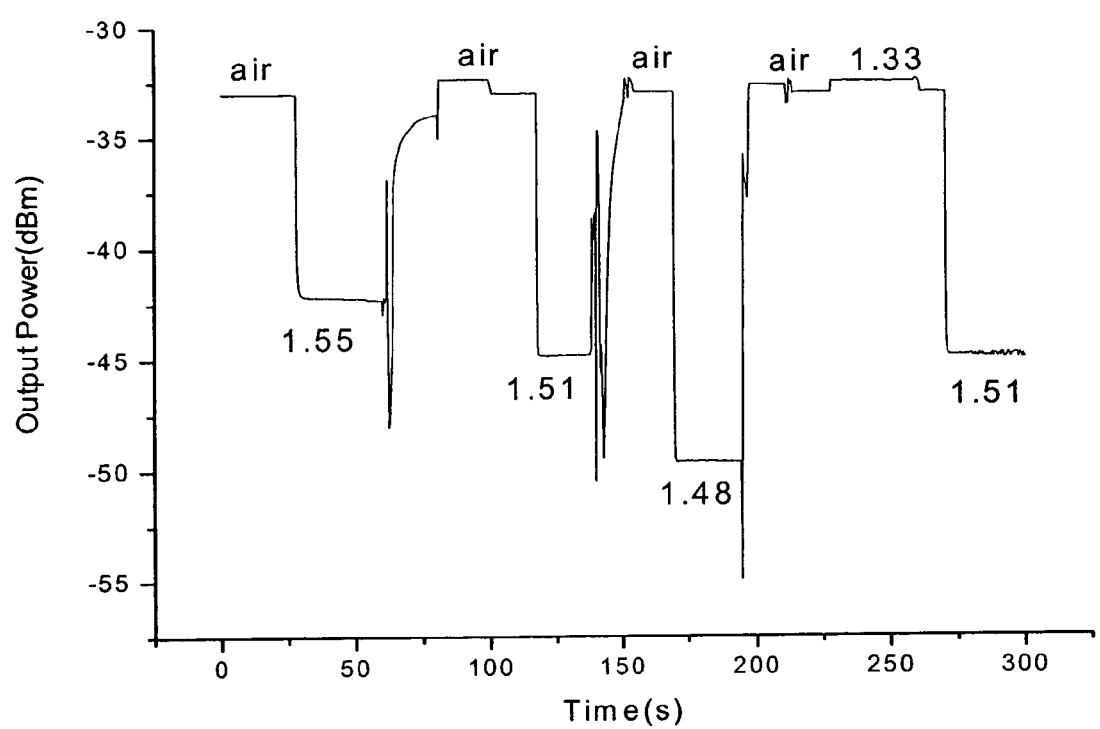
FIG. 10 shows exemplary measurements of optical losses with the sensor in FIG. 4 in measuring a mixture flow with different material components with a probe wavelength at 1550 nm.

FIG. 10 shows some measured output power of a fiber sensor as a function of time. A high loss in the output of the sensor represents that oil material appears.

Two or more differently configured sensors may be included in the instrument to respectively measure different materials. As an example, a two-sensor sensing instrument may have one sensor designed to measure air or water and the other to measure oil. The contents of the mixture flow with gas, water and oil may be determined by the processing circuit for the two sensors.

The above examples demonstrate that a sensing device can be designed based on optical evanescent coupling through a side-polished fiber port or waveguide to measure the presence and content fraction of a selected flow component in a multiphase flow. In addition, a combination of two or more such side-polished fiber sensors may be used for measuring different flow components in a multiphase flow based on measurement of the optical attenuation in each fiber sensor. This allows for simultaneous and dynamic measurement of different components in a mixture flow.

Only a few examples and implementations are disclosed. However, it is understood that variations and enhancements may be made without departing from the spirit of and are intended to be encompassed by the following claims.

What is claimed is:

1. An optical sensing device, comprising:
   a fiber having a side surface on fiber cladding within an evanescent field of guided light in the fiber and having said cladding thickness sufficient to fully contain said guided light in other parts of said fiber;
   a metal layer formed on the side surface and having a thickness to transmit the evanescent field, said thickness being uniform over said side surface extent;
   an optical detector to receive guided light in the fiber passing through the side surface and to produce a detector output; and
   a processing circuit to measure an optical loss of the guided light at the side surface from the detector output and operable to extract a property of the medium above the metal layer from the measured optical loss.

2. The device as in claim 1, wherein the processing circuit compares the measured optical loss to calibrated optical losses for different materials and identifies one material from the different materials as being present in the medium above the metal layer when the measured optical loss corresponds to a calibrated optical loss for the one material.

3. The device as in claim 1, wherein the processing circuit measures a duration of the measured optical loss of the identified one material and uses the measured duration to determine a percentage of the identified one material in the medium above the metal layer.

4. The device as in claim 1, further comprising a protective layer over the metal layer.

5. The device as in claim 1, wherein the optical detector receives light at a first wavelength in the guided light to produce a first detector output, and the device further comprising:
   a second optical detector to receive light at a second, different wavelength in the guided light to produce a second detector output,
   wherein the processing circuit uses a ratio of the first and the second detector outputs to determine the measured optical loss at the side surface.

6. The device as in claim 5, further comprising first and second optical filters to produce the light at the first wavelength and the light at the second wavelength, respectively.

7. The device as in claim 1, wherein the processing circuit operates to use a duration of a measured optical loss to determine a percentage of a material component in the medium above the metal layer.

8. An optical sensing device, comprising:
   a first sensor comprising (1) a first fiber having a first side surface on fiber cladding within an evanescent field of guided light in the first fiber, said cladding having a thickness sufficient to fully contain said guided light in other parts of said fiber, and (2) a first metal layer formed on the first side surface and having a first substantially uniform thickness to transmit a maximum amount of the evanescent field when a first material present above the first metal layer;
   a first optical detector to receive guided light in the first fiber passing through the first side surface and to produce a first detector output;
   a second sensor comprising a second fiber having a first side surface on fiber cladding within an evanescent field of guided light in the second fiber;
   a second optical detector to receive guided light in the second fiber passing through the second side surface and to produce a second detector output; and
   a processing circuit coupled to receive the first and the second detector outputs and measure optical losses at the first and the second side surfaces from the first and the second detector outputs, respectively, the processing circuit operable to determine presence of the first material from the measured optical loss in the first detector output and presence of a second material that changes an optical loss at the second side surface when present above the second side surface.

9. The device as in claim 8, wherein the processing circuit is operable to compare the measured optical loss from the first detector output to a calibrated optical loss measurement for the first material in determination of the presence of the first material at the first side surface.

10. The device as in claim 9, wherein the processing circuit measures a duration of a measured optical loss in each of the first and the second detector outputs and uses the measured duration to determine a percentage of a corresponding material in the medium measured by the first and second sensors.

11. The device as in claim 9, wherein the second sensor further comprises a second metal layer formed on the second side surface and having a second thickness to transmit a maximum amount of the evanescent field when the second material present above the second metal layer.

12. A method for using a fiber sensor to measure material components in a material mixture, wherein the fiber sensor comprises a fiber with a side surface on fiber cladding within an evanescent field of guided light in the fiber, said cladding having a thickness sufficient to fully contain said guided light in other parts of said fiber, and a metal layer formed on the side surface and having a substantially uniform thickness to transmit the evanescent field, the method comprising:
    contacting the fiber sensor with the material mixture under measurement so that the material mixture is present at the metal layer;
    directing a probing light beam at a probing wavelength into the fiber to allow for a fraction of the probing light beam to be coupled out of the side surface through the metal layer;
    measuring an optical loss of the probing light beam output from the fiber; and
    using the measured optical loss to determine at least whether a selected material component is present in the material mixture.

13. The method as in claim 12, further comprising comparing the measured optical loss to a calibrated optical loss measurement for a second selected material obtained at the same probing wavelength to determine whether the second selected material is present in the material mixture.

14. The method as in claim 12, further comprising comparing the measured optical loss to a calibrated optical loss measurement for a second selected material obtained at the same probing wavelength to determine whether the second selected material is present in the material mixture.

15. The method as in claim 12, further comprising measuring a duration of the measured optical loss for the selected material to determine a percentage of the selected material present in the material mixture.

16. The method as in claim 12, wherein the selected material is a gas.

17. The method as in claim 12, wherein the selected material is water.

18. The method as in claim 12, wherein the selected material is an oil.

19. The method as in claim 12, wherein the selected material is a liquid.

20. The method as in claim 12, further comprising:
    splitting the probing light beam output from the fiber into a first beam at a first wavelength and a second beam at a second, different wavelength,
    wherein the measurement of the optical loss includes:
    measuring an optical power level of the first beam,
    measuring an optical power level of the second beam,
    obtaining a ratio of optical power levels of the first and the second beam, and
    using the ratio to determine the measured optical loss.

* * * * *